Feb. 10, 1970  M. S. HATHAWAY  3,494,111
FILTER ASSEMBLY

Filed June 2, 1967  2 Sheets-Sheet 1

INVENTOR.
MILTON S. HATHAWAY
BY

ATTORNEYS

Feb. 10, 1970   M. S. HATHAWAY   3,494,111
FILTER ASSEMBLY

Filed June 2, 1967   2 Sheets-Sheet 2

INVENTOR.
MILTON S. HATHAWAY
BY
ATTORNEYS

United States Patent Office 3,494,111
Patented Feb. 10, 1970

3,494,111
FILTER ASSEMBLY
Milton S. Hathaway, 586 Carlin Road,
Northfield, Ohio 44067
Filed June 2, 1967, Ser. No. 643,096
Int. Cl. B01d 46/10
U.S. Cl. 55—419                                 2 Claims

ABSTRACT OF THE DISCLOSURE

A disposable air filter assembly for automobiles and the like, comprising inter-fitted housing sections, between which a filtering medium is compressed, and provision is made for limiting the extent to which one of the sections is nested in the other, while providing passageways of limited circumferential extent between the inter-fitted sections for passage of air into the filter.

---

This invention relates, as indicated, to a disposable filter assembly or unit.

A primary object of the invention is to provide a filter assembly or unit which is made of relatively inexpensive non-metallic materials, which are easily molded and assembled, so that the assembly or unit can be discarded or thrown away as soon as the filter means becomes clogged or inefficient in its filtering action.

Another object of the invention is to provide a disposable filter assembly or unit of the character described, consisting of interfitting or nested housing sections, including means for limiting the extent to which one of the sections can be nested in the other.

A further object of the invention is to provide a disposable filter assembly or unit of the character described, which is designed to provide a highly efficient air filtering action.

A still further object of the invention is to provide a disposable filter assembly or unit of the character described, comprising interfitting molded sections of thermoplastic material, which sections are heat-sealed or adhesively secured to each other, so that they cannot be removed from each other to permit insertion of a new filtering element, and which, therefore, must be discarded or thrown away.

Other objects and advantages of my invention will be apparent during the course of the following description.

In the accompanying drawings forming a part of this specification, and in which like numerals are employed to designate like parts throughout the same, FIG. 1 is a top plan view of a filter assembly, embodying the invention;

Figure 1:
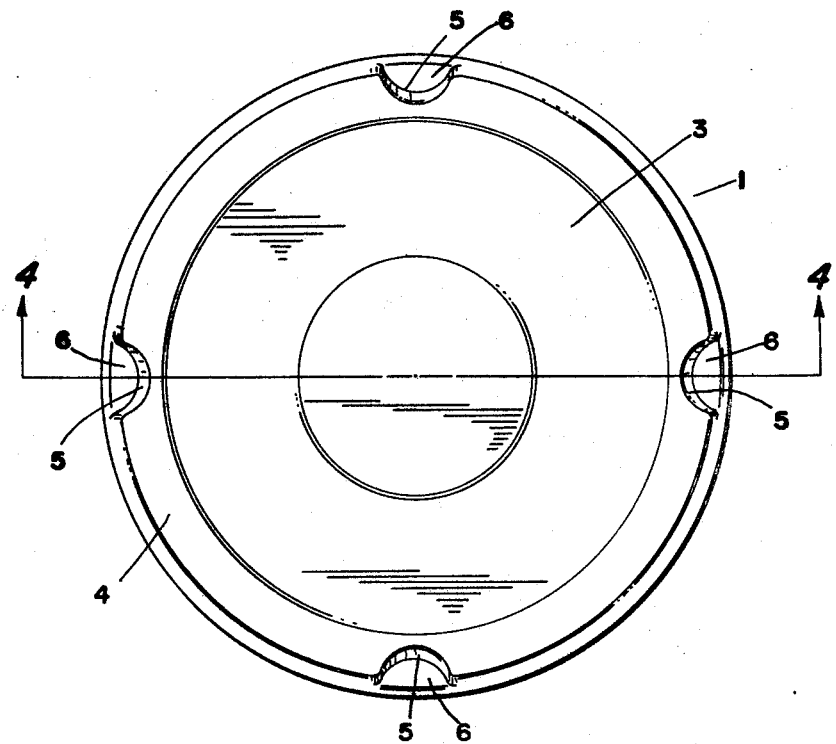
Figure 2:
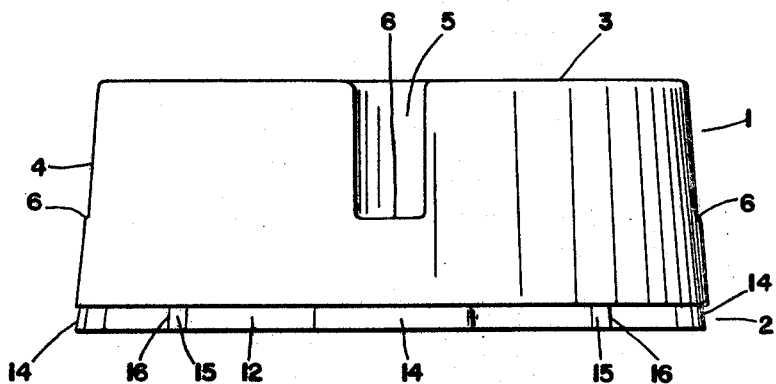
FIG. 2 is a front elevation view of the filter assembly.
Figure 3:
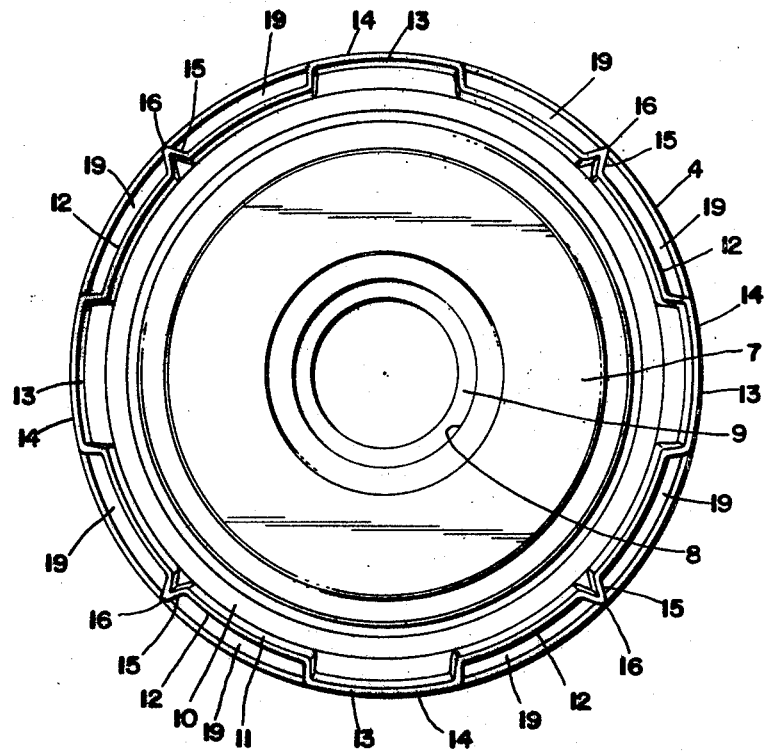
FIG. 3 is a bottom plan view of the filter assembly.
Figure 4:
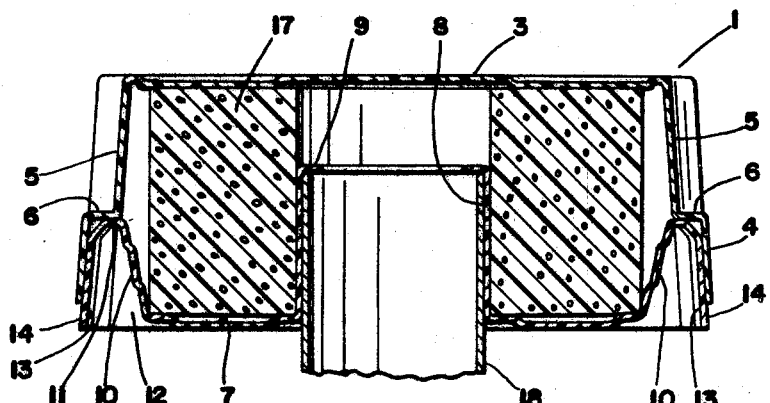
FIG. 4 is a cross-sectional view, taken on the line 4—4 of FIG. 1, and showing the unit as mounted on a crankcase breather pipe or ventilation tube.

Referring more particularly to the drawings, the filter assembly or unit is seen to comprise an upper housing section, generally designated by reference numeral 1, and a lower housing section, generally designated by reference numeral 2, both sections being molded of a heat-resistant thermoplastic resin or plastic, such, for example, as high impact polystyrene, polyvinyl butyral, polyethylene, and the like, and which can be readily molded from sheets by conventional vacuum molding processes.

The upper housing section 1 is molded to provide a circular top wall 3, and a frusto-conical side wall 4, the side wall having a series of circumferentially-spaced indentations 5 of semi-circular cross-section, which extend from the top wall 1 to points approximately two-thirds of the depth of the wall 4, these indentations being closed at the bottom, as by walls 6. The indentations 5 and walls 6 serve a purpose to be presently described.

The lower housing section 2 is molded to provide an annular base portion 7, from the inner edge of which a tubular element 8 extends upwardly terminating in an inturned flange 9. Extending upwardly and outwardly from the outer edge of the base portion 7 is an outer wall 10, from the upper edge of which a flange 11 extends horizontally outwardly, terminating in an outwardly-flared skirt portion 12.

The skirt portion 12 is provided at circumferentially-spaced points with embossments 13 having outer surfaces 14 which are tapered to correspond with the taper of the inner surface of the side wall 4 of the upper housing section 1.

The skirt portion 12 is also provided at points intermediate the embossments 13 with embossments 15 having outer edges 16 which are also tapered to correspond with the taper of the inner surface of the side wall 4 of the upper housing section 1.

Prior to assembling the housing sections 1 and 2, an annular filter element 17 of polyurethane foam or like filtering material is disposed on the base 7 of the housing section 2, the element having a wall thickness such as to substantially fill the space between the tubular element 8 and the outer wall 10, and having a height substantially greater than the height of the tubular element 8.

With the filter element thus disposed on the base 7, the housing section 2 is nested within the housing section 1, with the embossments 13 in alignment with the indentations 5 of the housing section 1, the nesting action being continued until the flange 11 engages the walls 6 of the housing section 1, which walls 6 thus constitute stops to limit the extent to which the housing section 2 can be nested into the housing section 1.

This nesting of the housing section 2 into the housing section 1 also acts to compress the filter element 17 in a vertical direction, thereby insuring that the filter element completely fills the space between the base 7 and the top wall 3.

After the nesting of the housing sections 1 and 2 has been completed, the surfaces 14 of the embossments 13 and the edges 16 of the embossments 15 are heat-sealed to the inner surface of the side wall 4 of the housing section 1, thereby providing a unitary filter assembly, in which the housing sections 1 and 2 cannot be removed from each other without destruction of these parts, and from which the filter element 17 cannot be removed.

Instead of heat-sealing the sections 1 and 2 to each other, as described, the surfaces 14 and edges 16, and the inner surface of the wall 4 may be provided with a suitable plastic cement or adhesive, prior to the assembly of the sections 1 and 2, so that when these parts are assembled, and the parts held in assembled relation, the cement or adhesive will serve as a means of providing a unitary filter assembly, in which the housing sections 1 and 2 cannot be removed from each other without destruction of these parts, and from which the filter element 7 cannot be removed.

In the use of the filter assembly or unit which has been described, the unit is mounted on a breather pipe 18 of a crankcase ventilation system, with the pipe 18 received in the tubular element 8, and the flange 9 resting on the upper end of the pipe 18.

During engine operation, atmospheric air is drawn upwardly through the passageways 19 formed by the embossments 13 and 15, and the skirt portion 12 and wall 4, such air then passing through the filter element 17 and down through the tubular element 8 and into the breather pipe 18. The indentations 5 also function as barriers to control or direct the incoming air to the filter element 17, thereby insuring a more uniform distribution of the air through this filter element.

When the filter element 17 becomes clogged and is no longer effective, for filtering purposes, the entire unit, consisting of the housing sections 1 and 2 and the filtering element 17, may be quickly and easily removed and thrown away, or otherwise disposed of.

This easy disposability of the entire unit is due to the fact that all parts of the unit are made of relatively inexpensive materials, which are formable to desired form or shape by relatively inexpensive methods, and to the fact that the housing sections can be quickly and easily assembled, without the use of expensive fastening means or methods, such as mechanical fasteners or crimping operations.

Having thus described my invention, I claim:

1. A disposable filter assembly comprising an upper housing section molded of thermoplastic material to provide a circular top wall and a frusto-conical side wall having a circumferentially spaced indentations equidistant from one another and extending from said top wall downwardly to points spaced substantially from the bottom of said side wall and having horizontal walls closing the bottoms of said indentations, said horizontal walls forming stop means, a lower housing section permanently secured to said upper section and molded of thermoplastic material to provide an annular base portion having a tubular central element extending upwardly from the inner edge of said base portion and terminating in an inturned flange, a side wall extending upwardly from the outer edge of said base portion and terminating at its upper edge in an out-turned flange adapted to engage said stop means to limit the extent to which said lower housing section can be nested in said upper housing section, and a skirt portion extending downwardly from the outer edge of said out-turned flange and provided at circumferentially-spaced points with embossments equidistant from each other and having outer surfaces sloped to correspond with the slope of the side wall of said upper housing section and engaging the inner surface of said side wall at areas in alignment with said first-named embossments, the spaces between said last-named embossments providing passageways for entrance of air into said filter assembly, and a filtering means disposed between said housing sections and compressed between said top wall and annular base portion.

2. A disposable filter assembly, as defined in claim 1, wherein said skirt portion is provided intermediate said embossments of the skirt portion with secondary embossments of lesser circumferential extent than said embossments of the skirt portion and having outer edges bearing against and sloped to correspond with the slope of the side wall of said upper housing section.

References Cited

UNITED STATES PATENTS

| 1,951,384 | 3/1934 | Zander. | |
| 2,046,093 | 6/1936 | Schaaf et al. | |
| 2,496,883 | 2/1950 | McKalip | 20—44 |
| 3,002,870 | 10/1961 | Belgarde et al. | 156—70 |
| 3,167,416 | 1/1965 | Humber et al. | 55—505 X |
| 3,266,229 | 7/1966 | Witkowski | 55—505 |
| 3,355,863 | 12/1967 | Pittsley | 55—504 X |

FOREIGN PATENTS

| 777,738 | 6/1957 | Great Britain. |
| 928,497 | 6/1963 | Great Britain. |

HARRY B. THORNTON, Primary Examiner

DENNIS E. TALBERT, JR., Assistant Examiner

U.S. Cl. X.R.

55—503, 506, 510; 210—460; 123—41.86